Oct. 20, 1942.　　　　M. E. FIENE　　　　2,299,574
HEATING SYSTEM
Filed Jan. 28, 1941
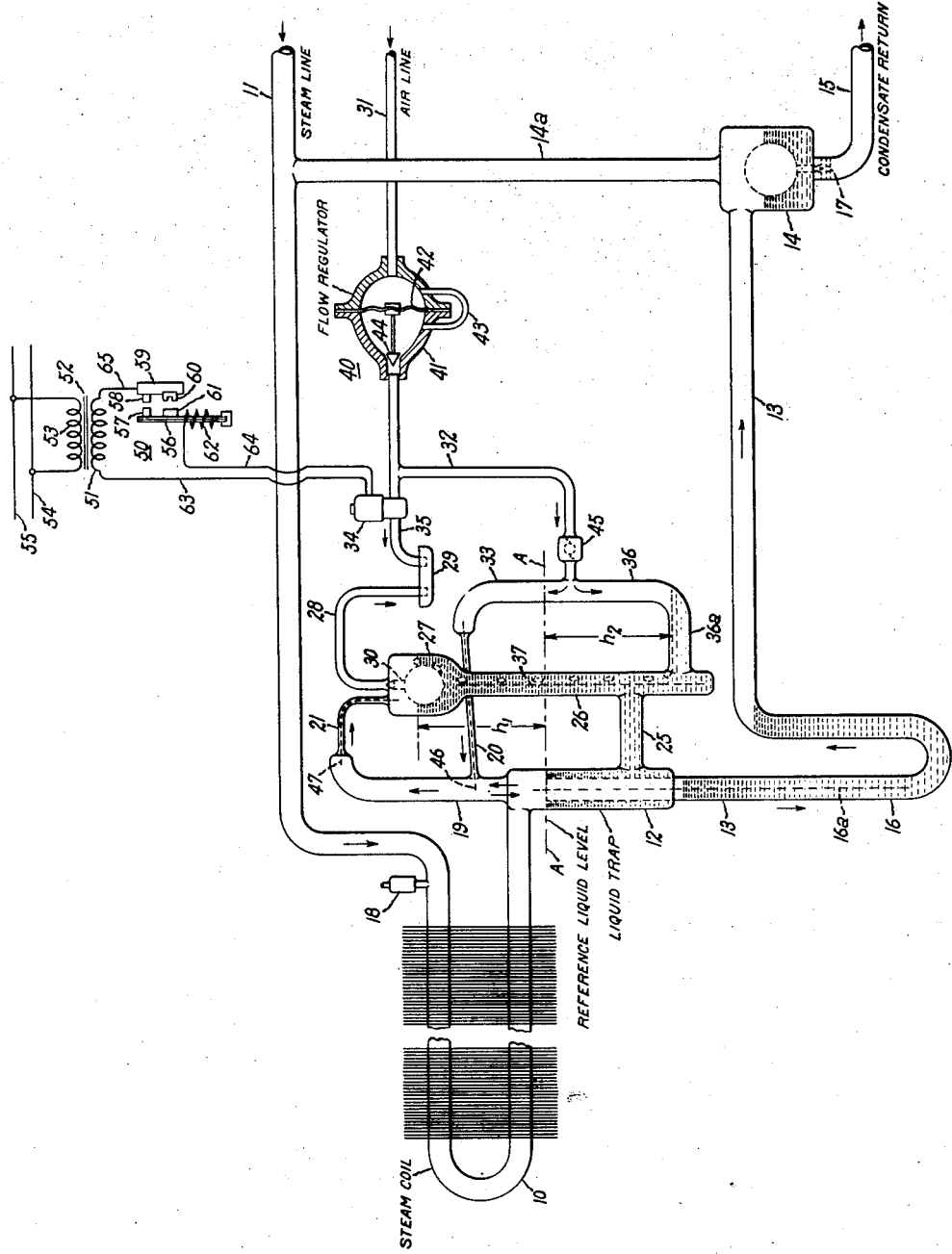
Inventor:
Marcus E. Fiene,
by Harry E. Dunham
His Attorney.

Patented Oct. 20, 1942

2,299,574

UNITED STATES PATENT OFFICE 2,299,574

HEATING SYSTEM

Marcus E. Fiene, Caldwell, N. J., assignor to General Electric Company, a corporation of New York Application January 28, 1941, Serial No. 376,312

6 Claims. (Cl. 236—36)

My invention relates to heating systems and more particularly to arrangements for thermostatically controlling the active heating surface of a heat exchanger supplied with heating fluid such as steam.

In heating systems for enclosures or dwellings, and the like, it is common to provide a heat exchanger of variable output and a thermostat responsive to deviations of the controlled temperature from a predetermined value for varying the output of the heater to maintain the controlled temperature within predetermined limits. One method of varying the capacity of a heat exchanger supplied with a heating fluid such as steam is to vary the amount of a displacement fluid, such as air, within the heat exchanger whereby the active heating surface and consequently the output of the heat exchanger, is correspondingly varied. By providing thermostatically controlled means for forcing air into the heater and venting air therefrom the output of the heater can be regulated or modulated to maintain the enclosure temperature within predetermined limits. However, with previous control systems of this type it has been found that there is a tendency for the controlled temperature to "hunt" or "overshoot" due to a lack of correlation between the degree of deviation of the controlled temperature and the rate of change of output of the heater.

Accordingly, it is one object of my invention to provide improved means for regulating the active heating surface of a heat exchanger in accordance with the degree of deviation of a controlled temperature from a predetermined value whereby the tendency of the system to "hunt" or "overshoot" is eliminated.

In the case of dwellings heated from a boiler furnace which is usually adapted for periodic operation, the steam pressure will vary considerably between maximum and minimum limits. This pressure variation is considerable particularly in cases where the firing of the furnace is controlled by a steam pressure responsive device which frequently has a differential of operation of three or four pounds per square inch of steam pressure to permit the furnace to run on reasonable operating cycles. In temperature control systems of the type referred to above where the output of a steam radiator or heater is varied by forcing air into and venting air from the heater, variations in the steam pressure have a tendency to vary the rate of air flow into and out of the heater. Thus, special consideration must be given to the pressure variations of the steam supply if the active heating surface of the heater is to be successfully controlled by the air blocking or displacement method.

It is another object of my invention to provide improved apparatus for regulating the active heating surface of a heat exchanger by the fluid displacement method which is so arranged that the flow of displacement fluid into and out of the heat exchanger is unaffected by the variations in the pressure of the heating fluid.

Further objects and advantages of my invention will become apparent as the following description proceeds and the features of novelty which characterize my invention will be pointed out with particularity in the claims annexed to and forming a part of this specification.

In accordance with the illustrated embodiment of my invention, air is intermittently forced into a heat exchanger connected to a source of heating fluid, such as steam, and air is vented therefrom continuously. The time intervals during which the air is forced into the heat exchanger are varied in accordance with the controlled temperature and the rates of air flow into and out of the heat exchanger are so correlated that when the controlled temperature is at a predetermined value the net change of blocking air in the heat exchanger and consequently the average heat output remains constant. However, upon any deviation of the controlled temperature from a predetermined value, however small, the time intervals during which the air is forced into the heat exchanger change so as to change the amount of the blocking air in the heat exchanger and vary the output in a direction to correct for the deviation and at a rate proportional to the amount of the deviation. A constant air flow into and out of the heat exchanger, which is unaffected by variations in the steam pressure, is obtained by establishing a definite pressure difference across a fixed air flow resistance by means of a head of liquid.

My invention will be better understood from the following description taken in connection with the accompanying drawing in which the single figure illustrates in diagrammatic form one embodiment of my invention.

Referring to the drawing, I have shown a heat exchanger in the form of a steam coil 10 for supplying heat to a space the temperature of which is to be controlled. The steam coil 10 is connected to a source of steam (not shown) by means of a conduit 11. When steam is admitted to the coil 10 the condensate collects in a condensate trap 12 by gravity. When the trap 12 becomes filled the condensate spills over into the conduit 13 through which it flows by gravity to the steam trap 14 and is subsequently discharged into a condensate return line 15. The conduit 13 is provided with a depending U-shaped bend 16 so that the condensate collects in the bend and forms a liquid seal and a baffle 16a acts to guide the condensate flow and prevent turbulence. An orifice 17 is provided in the condensate return line 15 to prevent any surging action which might destroy the liquid seal in the U-shaped bend 16. A by-pass conduit 14a connects the upper portion of the steam trap 14 to the steam supply conduit 11 and functions to prevent the loss of the liquid seal in the U-shaped bend 16 in case the steam trap should stick in the open position. To prevent the passage of blocking air into the steam system, a conventional thermostatically controlled air vent valve 18 is connected between the coil 10 and the steam supply conduit 11.

For the purpose of varying the active heating surface and consequently the heat output of the steam coil 10 a variable amount of displacement fluid, such as air, is forced into the condensate end of the steam coil. The amount of air in the coil 10 is varied by causing air to flow intermittently into a conduit 19 in communication with the condensate end of the coil 10 through an inlet metering tube 20 at a fixed predetermined rate and to flow continuously out of the coil and conduit 19 and through a discharge metering tube 21 at a fixed lower rate. By varying the length of time intervals during which air enters the coil through the inlet metering tube 20, the net amount of blocking or displacement air in the coil may be varied in a manner which will be more completely described below.

The apparatus, by means of which air is caused to flow through the metering tubes 20 and 21 at constant rates unaffected by variations of steam pressure in the coil 10, will now be described.

Connected to a lower portion of condensate trap 12 by means of an interconnecting conduit 25 is a vertical conduit 26 the upper portion of which is connected to a float chamber 27. The upper portion of the float chamber 27 is vented to the atmosphere through a conduit 28 which may discharge into a suitable drip pan 29. The pressure of the fluid in the coil 10 causes condensate liquid to be forced up from the trap 12 through the conduit 26 into the chamber 27 and form a U-shaped fluid column. The level of the liquid rises to a point where the float valve 30 closes the venting conduit 28 and the float thus maintains a constant head of liquid at a height $h_1$ above a reference liquid level determined by the overflow level of the condensate trap 12. This reference liquid level is indicated by the dotted line A. The discharge metering tube 21 is connected to permit continuous flow of air from the conduit 19 to the upper portion of the chamber 27. The air pressure in the upper portion of the chamber 27 is less than the pressure in the conduit 19 by an amount corresponding to a head of liquid $h_1$. Since the float valve 30 maintains $h_1$ constant there is a constant pressure drop across the discharge metering tube 21 so that the flow of discharge air therethrough remains constant, being unaffected by any variations of steam pressure in the coil 10 so long as the steam pressure does not fall below the value required to maintain the liquid level $h_1$.

Referring now to the apparatus by means of which air is caused to flow through the inlet metering tube 20 at a constant rate, a source of air under pressure greater than the maximum steam pressure, not shown, is connected to the inlet metering tube 20 by the air inlet conduits 31, 32 and 33. The flow of compressed air from the conduit 31 to the conduit 32 and the inlet tube 20 is controlled by a normally closed solenoid operated valve 34 located in a conduit 35 which is connected to vent the conduit 31 to the atmosphere on the low pressure side of the conduit 32. The arrangement is such that when the valve 34 is closed compressed air flows through the conduits 32 and 33 to the inlet metering tube 20. However, when the valve 34 is open, compressed air is vented through the conduit 35 to the atmosphere so that there is insufficient pressure to cause any air flow through the conduits 32 and 33 into the metering tube 20. Thus, the solenoid valve 34 controls the entrance of the compressed air into the steam coil 10 through the inlet tube 20.

For the purpose of regulating the pressure drop across the inlet metering tube 20, the conduit 33 has connected thereto a downwardly extending pressure regulating conduit 36 having a horizontally extending portion 36a connecting to the lower portion of the vertical liquid-filled conduit 26. When the valve 34 is open so that no air flows in to the conduit 33, liquid fills the conduits 36a, 36 and conduit 33 to the reference level A and forms a second U-shaped fluid column. However, when valve 34 is closed admitting air to the conduit 33 through conduit 32, the level of the liquid is depressed a distance $h_2$ below the reference level A as illustrated in the drawing. At this level excess air bubbles into conduit 26 and passes upwardly into the float chamber 27 from which it is discharged by operation of the float valve 30. A baffle 37 is provided in the conduit 26 to guide the passage of the air bubbles and to prevent the air from tending to lift the liquid column. The bubbling of excess air through the conduit 26 acts to regulate the air pressure in conduit 33 and it will be seen that this pressure exceeds the pressure in conduit 19 by an amount equal to the pressure exerted by the liquid head $h_2$. Since $h_2$ remains constant while valve 34 is closed, the pressure drop across the inlet tube 20 will also remain constant. Furthermore, the liquid head $h_2$ is unaffected by pressure fluctuations in conduit 19 resulting from steam pressure variations because of a pressure balancing action and therefore the pressure drop across the inlet in tube 20 and consequently the air flow therethrough is likewise unaffected.

A flow regulator 40 is provided in the conduit 31 on the high pressure side of conduit 32 to prevent unnecessary high consumption of compressed air during the time when the solenoid valve 34 is in the open position. Any suitable flow regulating device may be provided, such devices being well known in the art. As schematically illustrated, the device may comprise a casing 41 having a diaphragm 42 arranged therein forming two chambers within the casing with a restricted passage 43 provided around the diaphragm 42 permitting the flow of air between the chambers. Secured to the diaphragm 42 for operation thereby is a valve 44 for regulating the flow of air into conduits 32 and 35. The device will operate so that when the solenoid valve 34 opens the valve 44 will be moved to a more closed position to limit the rate of air flow through the venting conduit 35. Conversely, when the solenoid valve 34 closes the valve 44 will move toward a more open position to permit the proper flow of air through the conduit 32. The flow regulator is adjusted so that it will pass air at a rate somewhat in excess of that required to start air bubbling up through the conduit 26 and to supply the inlet tube 20 to take care of any leakage past the seat of valve 34 when it is in the closed position. In this connection it should be noted that by locating the solenoid valve 34 in the venting conduit 35 as shown, rather in series with the compressed air line any reasonable amount of leakage of the valve 34 in a closed position does not interfere with the proper operation of the system and when there is no leakage excess air merely increases the bubbling rate in conduit 26 and does not affect the air pressure in conduit 33.

In order to prevent compressed air from leaking from the conduit 33 through the conduits 32 and 35 when the valve 34 is open, a check valve 45 is placed in the conduit 32. Preferably the check valve is located below the water level A so that when the valve 34 is open the valve will be covered with liquid to form a tight seal.

The amount of blocking air in the coil 10 is determined by the relative rates at which the blocking air flows in through the inlet metering tube 20 and is discharged through the discharge metering tube 21. The resistance to air flow of the discharge tube 21 is made such that the air will be discharged from the coil therethrough at some predetermined rate which may, for example, be of the order of three tenths of a cubic foot per hour. The resistance to air flow of the inlet metering tube 20 is made such that the air flows therethrough into the coil at a greater rate than it is discharged from the tube 21 and the inlet flow rate may, for example, be of the order of six tenths of a cubic foot per hour. Hence, for the example given, the net flow of air into the coil will be a rate of three tenths of a cubic foot per hour when the valve 34 is closed and the air will be discharged from the coil at the same rate when the valve 34 is open.

In some cases during starting conditions condensate may tend to collect in the metering tubes 20 and 21 and form water slugs, separated by air bubbles, so that the normal pressure drop across the metering tubes is insufficient to start the air flow therethrough and the tubes remain clogged. This difficulty can be eliminated by placing longitudinally extending fine wires 46 and 47 in the metering tubes. These wires tend to displace air bubbles in such a manner that a substantially continuous body of water is formed along the bottom of the tube leaving the upper portions unobstructed. The consequent reduction of surface tension effects permits the water to flow out of the tubes at the small available pressure difference.

The operaion of the solenoid operated valve 34 is controlled by a thermostat 50 located in the space that is heated by the steam coil 10, the temperature of which is to be controlled. The operating coil (not shown) of the solenoid operated valve 34 is energized from a suitable source of power which may be the secondary winding 51 of a step-down transformer 52 having a primary winding 53 connected to power lines 54 and 55. The thermostat 50 comprises a bimetallic temperature responsive element 56 which is fixed at one end and carries at its free end a movable contact 57. Cooperating with the movable contact 57 is a fixed contact 58 mounted upon a support 59. Also attached to the support 59 is a permanent magnet 60 which, in cooperating with an armature 61 attached to the bimetallic temperature responsive element 56, acts to give the thermostat a temperature differential of operation, that is, the thermostat contacts will snap to the closed position at a predetermined responsive element temperature and will snap to the open position at a predetermined higher temperature. In order to cause the thermostat to act as a timing means by continuously cycling between open and closed contact positions at spaced time intervals variable in accordance with the thermostat ambient temperature, an auxiliary electric heating coil 62 is provided which is connected to be energized when the thermostat contacts 57 and 58 are in the closed position and deenergized when the thermostat contacts are in the open position. This is accomplished by connecting the heater 62 in series with the operating coil of the valve solenoid. The control circuit may be traced as follows: one side of the secondary winding 51, the conductor 63, the operating coil of the solenoid valve 34, conductor 64, the heater coil 62, the bimetallic blade 56, contacts 57 and 58, conductor 65 to the other side of the secondary winding 51. From the circuit connections it will be seen that when the thermostat contacts are closed both the heater 62 and the solenoid valve 34 will be energized and when the contacts open the heater and solenoid valve will be deenergized. Due to the heating action of the heater 62 the thermostat continuously cycles between open and closed contact positions for a range of thermostat ambient temperatures depending on the heating capacity of the heater 62 and the opening and closing temperatures of the thermostat. It is necessary that the maximum heating effect of the heater 62 (the number of degrees of temperature it can raise the temperature-responsive element of the thermostat above ambient if continuously energized) be greater than the temperature differential of operation of the thermostat to obtain proper cycling and timing action. The heater capacity and the opening and closing temperatures of the thermostat are such that cyclic action of the thermostat is obtained for a range of temperatures extending on both sides of a predetermined space temperature to be maintained. The per cent thermostat cycle time the contacts remain closed bears a fixed relationship to the thermostat ambient temperature within this cycling range.

The operation of my improved heating system will now be described. Let it be assumed that the space heated by the steam coil 10 is to be maintained at 75° F.; that the thermostat 50 is set so that it continuously cycles for a range of temperatures say from 70 to 80° F., and that at 75° F. the contacts 57 and 58 remain closed 50 per cent of the thermostat cycle time. In the following discussion the per cent of thermostat cycle time that the contacts remain closed will be referred to as the per cent operating time of the thermostat contacts. Also, let it be assumed that the airflow resistances of the metering tubes 20 and 21 are such that when the valve 34 is closed the air will flow into the coil 10 through the inlet metering tube at a rate that is twice the continuous discharge rate through the metering tube 21. Now if the space temperature is at the desired value, that is, 75° F., the thermostat will continuously oscillate or cycle between open and closed contact positions, the per cent operating time of the contacts being 50 per cent. Since the valve 34 is controlled directly by the thermostat it will be open 50 per cent of the thermostat cycle time, and, of course, closed 50 per cent of the cycle time. Under the conditions assumed the air inlet rate is twice the discharge rate and it is clear that when the valve 34 is open and closed equal periods of time the net amount of blocking air in the coil 10 per cycle will remain unchanged. Thus the average active heating surface of the coil 10 and hence the heat output per cycle will remain constant and an equilibrium condition will obtain.

If the space temperature drops to say 72° F., the per cent operating time of the thermostat contacts will increase to a value greater than 50 per cent and therefore the valve 34 will be opened a longer time than it is closed. Since more blocking air leaves the coil than enters per cycle of thermostat operation, the net amount of blocking air in the coil will decrease whereby the active heating surface and the heat output of the coil increases and more heat is supplied to the heated space. As the space temperature rises the per cent operating time of the thermostat contacts gradually decreases so the rate at which the average amount of blocking air per cycle in the coil 10 changes until finally when the normal temperature of 75° F. is reached the net amount of blocking air in the coil per cycle remains constant at a new value and a new equilibrium condition obtains.

If the space temperature rises to some value, say 78° F., the per cent operating time of the thermostat contacts decreases to a value less than 50 per cent and hence the valve 34 remains closed a longer period of time than it remains open with the result that the average amount of blocking air in the coil 10 per cycle increases causing a decrease in the heat output of the coil. As the space temperature falls due to the decreased heat output of the coil 10 the operating time of the thermostat contacts gradually increases causing a decrease in the rate at which the average amount of blocking air in the coil 10 per cycle changes. Finally, when the normal temperature 75° F. has been reached the operating time of the thermostat contacts will again equal 50 per cent and the net amount of blocking air in the steam coil 10 will remain constant at a new value with the result that a new equilibrium condition will obtain with a different heat output of the coil 10.

Thus it will be seen that my improved heating control system functions to automatically vary the active heating surface and hence the heat output of coil 10 so as to maintain the space temperature constant. It is important to note that there is no fixed relation between the per cent operating time of the thermostat contacts and the amount of blocking air in, and hence the heat output of, the heater coil 10. Thus, for example, under different load conditions the coil 10 might be one-half, one-quarter, or three-quarters full of blocking air with 50 per cent operating time of the thermostat contacts corresponding to the desired space temperature. Thus, a floating type of control is obtained with the result that there is no drift in the controlled temperature with varying loads such as is obtained with proportional position type control. It is also important to note that the rate of change of the average amount of blocking air in the coil 10 per cycle is a function of the deviation of the space temperature from the normal value. Thus when the deviation of the controlled temperature is large, the rate of correction of the heat output of coil 10 is correspondingly large and as the deviation decreases, due to the corrective action, the rate of change of output of the coil correspondingly decreases with the result that the tendency of the control to "hunt" or "overshoot" is avoided. In other words, my improved air blocking control system gives what is known as a proportional-floating control which combines the advantages of a proportional position and the floating types of control systems.

Since the pressure drops across the metering tubes 20 and 21 and hence the air flow rates therethrough are determined solely by the liquid heads $h_1$ and $h_2$ which remain constant, pressure fluctuations in the steam supply have no effect on the air flow rates with the result that very stable operation is obtained.

While I have shown and described particular embodiments of my invention, it will occur to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In a temperature control system, a heat exchanger connected to a source of heating fluid and arranged to supply heat to a space the temperature of which is to be controlled, a source of displacement fluid under pressure greater than the pressure of said heating fluid, an inlet conduit interconnecting said heat exchanger and said source of displacement fluid for admitting said displacement fluid to said heat exchanger at a predetermined inlet rate, a discharge conduit for continuously venting displacement fluid from said heat exchanger at a rate less than said inlet rate, a valve in said inlet conduit for controlling the flow of fluid therethrough, and means for alternately opening and closing said valve at spaced time intervals variable in accordance with the temperature of said space.

2. In a temperature control system, a heat exchanger connected to a source of heating fluid and arranged to supply heat to a space the temperature of which is to be controlled, a source of displacement fluid under pressure greater than the pressure of said heating fluid, control means comprising a two-position control device for permitting displacement fluid to flow from said source to said heat exchanger at a constant rate when said control device is in one position and for causing displacement fluid to be vented from said heat exchanger at a constant rate when said control device is in the other position, and means for intermittently moving said control device from one to the other of said positions at spaced time intervals variable in accordance with the temperature of said space.

3. In combination, a heat exchanger connected to a steam source and arranged to supply heat to a space the temperature of which is to be controlled, a source of air under pressure greater than said steam source, an air inlet conduit interconnecting said source of air and said heat exchanger for admitting air to said heat exchanger at a predetermined rate, a discharge conduit for continuously venting air from said heat exchanger at a rate less than said inlet rate, a valve for controlling the flow of air through said inlet conduit, means including a thermostat for actuating said valve between open and closed positions said thermostat being responsive to the temperature of said space and having high and low temperature positions corresponding to open and closed positions of said valve, and an electric heater associated with said thermostat arranged to be energized when said thermostat is in the low temperature position and deenergized when said thermostat is in the high temperature position whereby said thermostat intermittently moves between low and high temperature positions at spaced time intervals variable in accordance with the thermostat ambient temperature.

4. In combination, a heat exchanger connected to a source of heating fluid and arranged to supply heat to a space the temperature of which is to be controlled, means for forcing a displacement fluid into said heat exchanger at a constant inlet rate, and means for continuously venting displacement fluid from said heat exchanger at a constant discharge rate, said discharge rate being less than said inlet rate, and means for intermittently precluding the flow of displacement fluid into said heat exchanger at spaced time intervals variable in accordance with the temperature of said space.

5. In combination, a heat exchanger connected to a source of steam, a metering tube connected to said heat exchanger, means for causing a displacement fluid flow through said metering tube to vary the effective heating surface of said heat exchanger, and a wire located in said tube and extending in a longitudinal direction thereof for preventing condensate from clogging said tube.

6. In combination, a heat exchanger connected to a steam source, a source of air under pressure greater than said steam source, an air inlet metering tube connected to said heat exchanger, an air inlet conduit interconnecting said source of air and said inlet metering tube, a control valve operable to admit or preclude a flow of air into said inlet conduit, a condensate trap communicating with said heat exchanger, a float chamber provided with a venting passage, a float valve in said chamber controlling said venting passage, a conduit interconnecting said float chamber and said trap arranged to form a U-shaped fluid column, said float valve acting to maintain the level of liquid in said float chamber a predetermined height above the liquid level in said trap, a pressure regulating conduit interconnecting said air inlet conduit and said fluid column to form a second U-shaped fluid column arranged so that when air is admitted to said inlet conduit the level of the liquid in one leg of said second U-shaped fluid column is depressed a predetermined distance to permit a portion of the air entering said inlet conduit to bubble upwardly in said first fluid column into said float chamber, and conduit means including a discharge metering tube interconnecting said heat exchanger and the upper portion of said float chamber.

MARCUS E. FIENE.